Nov. 3, 1953        H. M. GEYER        2,657,539

SYNCHRONIZED POWER TRANSMITTER

Filed March 13, 1952        2 Sheets-Sheet 1

INVENTOR.
HOWARD M. GEYER
BY
HIS ATTORNEYS.

Nov. 3, 1953  H. M. GEYER  2,657,539
SYNCHRONIZED POWER TRANSMITTER
Filed March 13, 1952  2 Sheets-Sheet 2

INVENTOR.
HOWARD M. GEYER
BY
HIS ATTORNEYS

Patented Nov. 3, 1953

2,657,539

UNITED STATES PATENT OFFICE 2,657,539

SYNCHRONIZED POWER TRANSMITTER

Howard M. Geyer, Dayton, Ohio, assignor to General Motors Corporation, Detroit, Mich., a corporation of Delaware Application March 13, 1952, Serial No. 276,427

9 Claims. (Cl. 60—97)

This invention relates to control mechanism for fluid pressure operated power transmission devices.

It is among the objects of the present invention to provide control mechanism for a plurality of fluid pressure operated power transmission devices or actuators, the control mechanism connecting adjacent actuators, synchronizing their operation so that if one actuator is overloaded and the other underloaded, the latter will assist the overloaded actuator in performing its work.

Further objects and advantages of the present invention will be apparent from the following description, reference being had to the accompanying drawings wherein a preferred embodiment of the present invention is clearly shown.

Figure 1:
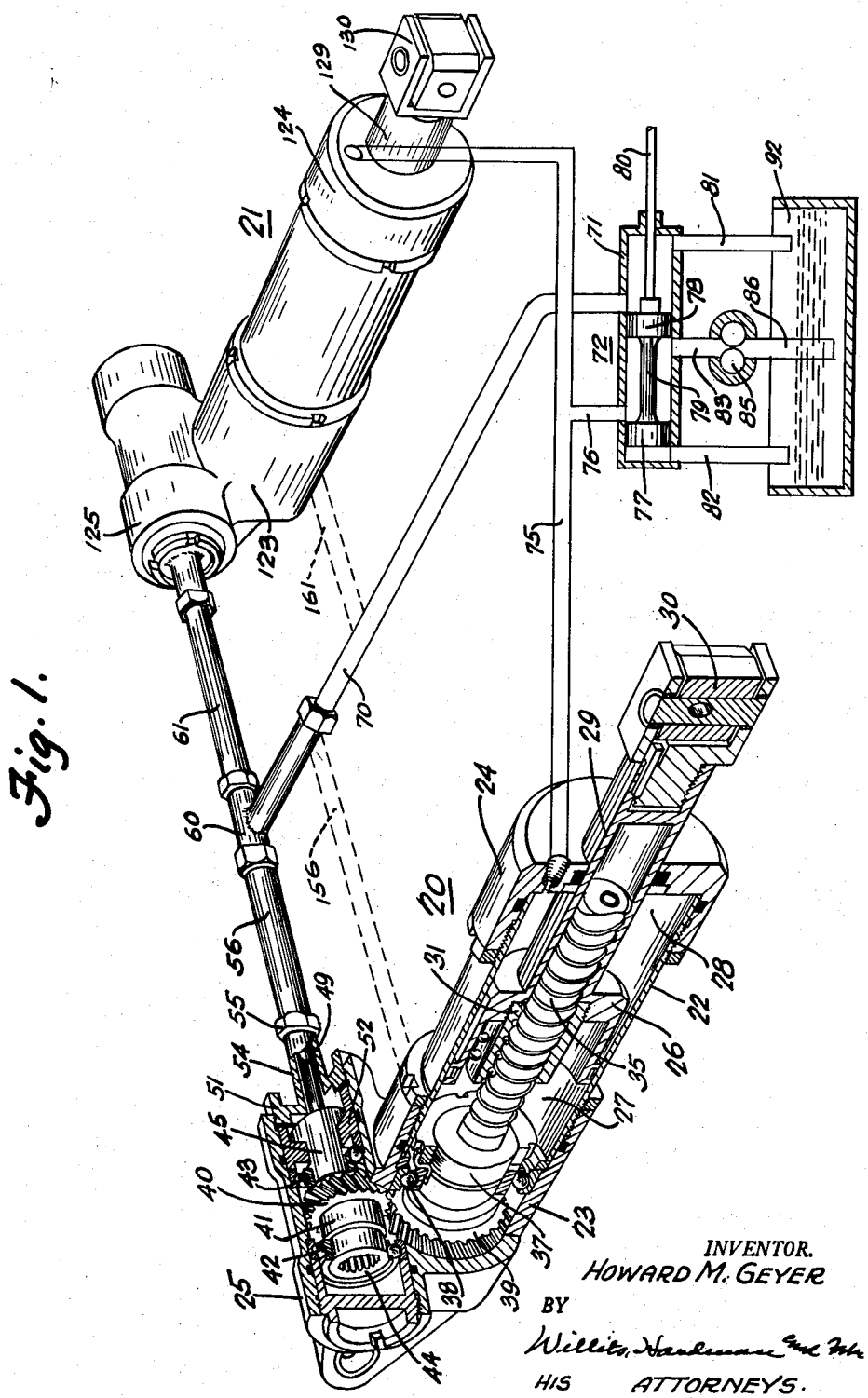
Fig. 1 is a view, partly in broken away perspective and partly diagrammatic, illustrating two identical actuators equipped with the present invention.

The actuator disclosed in the drawings consists of a cylinder in which a piston is reciprocated by having fluid pressure introduced into the cylinder on one side or the other of the piston therein. The piston has a rod extending through a closure member at one end of the cylinder, said rod being attachable to any suitable load for moving it. A screw shaft, rotatably mounted in the head member at the other end of the cylinder, and immovable longitudinally of the cylinder, is connected to the piston so that reciprocation of the piston rotates the screw shaft.

In one installation, the actuators, as shown in Fig. 1, are secured to an immovable part of an airplane, the piston rods of said actuators being attached to separate brake flaps provided on the wings of the plane. For a safe landing of the plane equalized braking effect is essential and thus it is necessary that both wing flaps be operated together and at substantially the same angularity. Sometimes, the plane approaching a landing will not come in straight but at an angle referred to as "coming in at a yawl," which subjects the brake flaps to unequal air pressures and thus one flap will take a greater force to adjust it than the other. In such a case, the fluid pressure operated actuators, used to move and adjust said flaps, must be synchronized so that both act together to adjust the differently loaded brake flaps at a like angle for obtaining equalized braking effort.

Referring to the drawings, two interconnected actuators 20 and 21 are illustrated, each being identical in construction and therefore the one shown in section in Fig. 1 will be referred to for detail constructional description. A cylinder 22 has two end covers 23 and 24 secured thereto in any suitable manner so as to be leak-proof. End cover 23 has an extension forming a cylindrical cross-head 25, the axis of which is substantially at right angles to the axis of the cylinder 22 and displaced therefrom. A piston 26 is reciprocative in the cylinder 22 and forms two work chambers 27 and 28 in the cylinder. Piston 26 has a tubular extension forming a hollow piston rod 29 which extends through work chamber 28 and an opening in the end cover 24 to the outside of the actuator. An attachment block 30 is secured to the outer end of rod 29, providing for the anchoring of said rod to the movable part to be adjusted or moved, for instance, the brake flap. The opening in end cover 24 in which rod 29 is slidably supported, is fitted with suitable packing to seal against leakage at this point. An interiorly threaded sleeve or hollow nut 31 is secured to the piston so as to be movable therewith. This nut threadedly receives the screw shaft 35 which extends through the nut and into the hollow piston rod 29.

Figure 2:
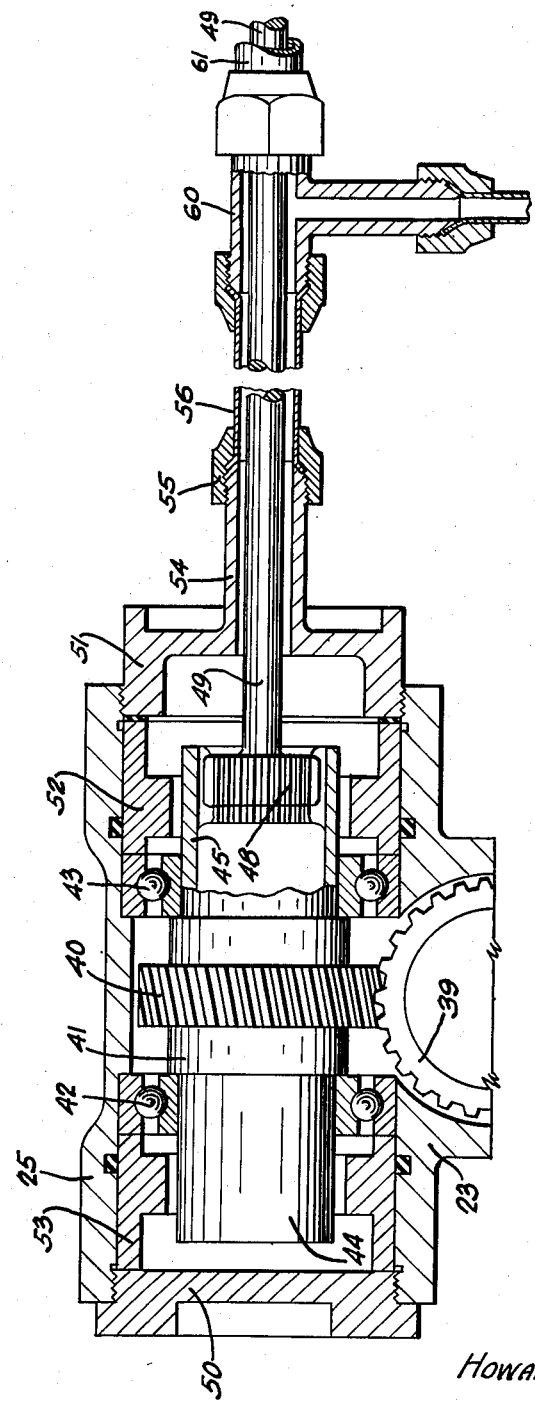
Fig. 2 is a fragmentary, sectional view at substantially full size scale, showing a portion of the end housing of an actuator and the means for connecting it to a similar portion of a second actuator.

The end of the screw shaft 35 opposite that end extending into the piston rod has a cylindrically shaped bearing block 37 securely attached thereto, said bearing block being rotatably supported in the ball bearing 38, which, in turn, is secured within the end cover 23. To this bearing block 37 there is attached a helical gear 39 which operatively meshes with a cooperating helical gear 40. The Fig. 2 clearly illustrates these two helical gears, the axes of which are at right angles one to another and vertically displaced. Gear 40 is supported upon a barrel-shaped hub 41 which is rotatably carried in ball bearings 42 and 43 mounted within the cross head portion 25 of the end cover 23. The barrel-shaped hub 41, supporting the helical gear 40, has recessed ends 44 and 45 interiorly splined to receive the splined head 48 of a rod or drive shaft 49. Where only two actuators are to be connected, as shown in Fig. 1, the one splined end portion of the hub 41, in Fig. 2, the end 44 is covered by any suitable end cap 50 screwed into the interiorly threaded end of the cross head 25. The opposite end of the cross head portion 25, also interiorly threaded, receives an attachment cap 51 which engages the collar 52 within the cross-head to hold the adjacent ball bearing 43 in position. Where the opposite end of the cross-head is not used for connection to another actuator, the cap 50 maintains a similar abutment collar 53 in position within the cross-head 25 to hold the ball bearing 42 in proper position.

The attachment cap 51 has a tubular extension 54, the outer end of which is exteriorly threaded to receive a clamping nut 55 for securely fastening a conduit or shroud 56 to the tubular extension 54 of the attachment member 51. The engagement of the conduit 56 with the end of the tubular extension 54 under the effect of the clamping nut 55 is of such a character that fluid leaks in response to the fluid pressure within the conduit are substantially prevented at the juncture. The drive shaft 49 with its splined head 48 at one end drivingly engages the interior splined portion of the end 45 of the gear supporting hub 41 and extends through the tubular extension 54 of the attachment member 51 and through the conduit 56, and has a splined head similar to head 48 operatively secured to a gear supporting hub in actuator 21 corresponding to the hub 41 and its portion 45 in the actuator 20. The conduit or shroud 56 has its one end attached to a T-shaped coupling 60 in a manner similar to the attachment of the conduit 56 to the tubular extension 54 of the attachment cap 51. A conduit 61, similar to conduit 56, has its one end secured to the T-shaped coupling 60, the other end of said conduit 61 being secured to the actuator 21 in a manner similar to the attachment of conduit 56 to the attachment member 51 of actuator 20. As has previously been mentioned, the rod or shaft 49 extends through conduit 56, T-shaped coupling 60 and the conduit 61, the one end of this rod being drivingly secured to the gear supporting hub 41 for gear 40 in actuator 20, the other end of this rod 49 being similarly, drivingly connected to the members in actuator 21 comparable to parts 41 and 40 of the actuator 20, which members are housed within cross-head portion 125 of the end cover 123 of actuator 21. From the aforegoing, it may be seen that the screw shafts of both actuators are operatively connected one to the other through gearings 39 and 40 in the actuator 20, gear supporting hub 41 in said actuator 20, rod 49 and gears in the actuator 21 similar to gears 39 and 40 in actuator 20 as well as a gear supporting hub in actuator 21 similar to member 41 in the actuator 20.

In the preferred form of construction, as illustrated in Fig. 1, the main arm of the T-shaped coupling 60 is communicatingly attached to a conduit 70 which leads to the casing 71 of a selectively operative control valve 72. Both working chambers 28 of the respective actuators 20 and 21 are in communication with each other through a conduit 75 which has a branch pipe 76 leading therefrom into the interior of the casing 71 of the valve 72. Within casing 71 there is provided a slide valve consisting of spaced head portions 77 and 78 tied together in proper spaced relation by an intermediate web 79 and having an operating rod 80 attached thereto which slidably extends through one end of the casing 71 for purposes of reciprocating the valve whose head portions 77 and 78 slidably fit within the casing. The one end of casing 71 has a conduit 81 leading therefrom and into a fluid supply tank 92. A similar conduit 82 connects the opposite end of casing 71 with said supply tank. Intermediate the ends of the casing 71, a pipe 83 leads from the interior of the casing to a pump 85, operation of which is adapted to draw fluid from the tank 92 through pipe 86 and deliver it through pipe 83 into the interior of the valve casing 71. When the valve is in the position as shown in Fig. 1, fluid pressure delivered by the pump 85 into the interior of the casing will be directed through the pipe 76 and its communicating conduit 75 to the working chambers 28 of the respective actuators 20 and 21. For purpose of this description, it may be stated that the working chamber 28 of the actuator 21 is provided within the end cover member 124 of said actuator. In this valve position, the end of the valve chamber 71 communicating with the pipe 70 is in communication with the supply tank 92 so that it may drain thereinto. Thus any fluid within the corresponding chambers 27 of the two actuators, on the side of the pistons 26 opposite chamber 28, will be in communication with each other through the end cover members 23 and 123 and the connecting conduits 56, 61, T-coupling 60, to which both conduits are secured, and the pipe 70.

When the valve is moved by the manually operable rod 80 to its opposite position, fluid pressure from the pump 85 will be delivered through pipe 70 and conduits 56 and 61 to the work chambers 27 of the two actuators, while the work chambers 28 of said actuators will be connected through pipes 75 and 76, valve casing 71 and conduit 82 with the supply tank 92, permitting said work chambers to discharge their fluid into the supply tank 92 as the pistons 26 are reciprocated to force the fluid from chambers 28.

The piston rod 129 of the actuator 21 has an attachment block 130 corresponding to attachment block 30 of the actuator 20, thereby providing means for attaching the actuator 21 to any suitable movable member, as, for instance, a brake flap (not shown) similar to one to which actuator 20 is connected.

When the valve 72 is in the position as shown in Fig. 1, and pressure is delivered to the corresponding work chambers 28 of the two actuators 20 and 21, the two corresponding pistons 26 of said actuators will be reciprocated toward the end closure members 23 and 123 of said actuators, this reciprocation of the pistons, due to their operative connection with the respective piston rods 35, turning said rods 35, thereby turning the bearing blocks 37 and corresponding helical gears 39. Now these two gears are connected together by helical gears 40 and the shaft 49 so that they cannot be rotated independently but must be rotated in unison. If, for instance, this reciprocation of piston 26 in actuator 20 causes the shaft 51 to be rotated clockwise, then the same directional reciprocation of the coinciding piston in actuator 21 will tend to rotate said shaft 49 in a similar direction through the gearing in said actuator 21. If, for any reason, one actuator is required to move a greater load than the other, the lesser loaded actuator will assist the heavier loaded actuator. For instance, if the brake flap operatively adjusted by actuator 20 is exposed to greater resisting air currents, then the brake flap, being moved by the actuator 21, due to this interconnection of the actuators, both hydraulically and mechanically, actuator 21 having the lighter load, will assist the actuator 20, the extra load on said actuator 20 thus is compensated for by the synchronizing connection between the heavier loaded actuator 20 and the one having the lighter load. The same effect will be attained if the actuators are operated in the opposite direction, that is, when the fluid pressure is directed through pipe 70 through the T-coupling 60 and through its divergent conduits 56 and 61 to their respective actuators 20 and 21, and their corresponding work chambers 27. It will be understood that the interior of the conduits 56 and 61 and the tubular portions 54 of the mounting members 51 are in communication with the respective chambers 27 through spaces and crevices provided by the bearings 43 and 38 and any working parts therebetween.

Where it is desired to use the conduits or pipes 56 and 61 merely as stiffening casings or shrouds between the interconnected actuators 20 and 21 and their connecting rod 49, pipe 70 may have diverging branch portions 156 and 161, as shown in dash lines in Fig. 1, which branches lead directly into the end closure members 23 and 123 respectively, to provide communication between the corresponding work chambers 27 in said end closure members. The preferred form, however, which uses the casing or shroud not only as a cover for the synchronizing drive shaft 49 but as a fluid conductor also, provides a more suitable and economical construction. Any suitable type of leak-proof connecting means may be provided between the conduit portions 56 and 61 and the T-shaped coupling 60 as well as the corresponding connections with the two actuators. If a series of actuators, more than two, are to be interconnected, then the cover caps 50 may be removed from them whereby the splined end of the gear supporting hubs 41 are exposed and adapted to receive the splined head portion 48 of other connecting rods 49 selected to be used. In each instance, the conduits 56 and 61 would be connected to the common conduit 70 leading to the valve 72 and conduits 75 from the various actuators would be connected to the pipe 76.

While the embodiment of the present invention as herein disclosed, constitutes a preferred form, it is to be understood that other forms might be adopted.

What is claimed is as follows:

1. In combination with a plurality of hydraulically operated actuators each comprising a cylinder having a piston movable in either direction by fluid pressure in said cylinder; a screw shaft rotatably supported within the cylinder and immovable longitudinally thereof, said shaft threadedly engaging the piston so as to be rotated thereby in response to reciprocation thereof; gearing operatively connected with the screw shaft; mechanical power transmitting means operatively connecting together the gearing of all of the actuators for synchronizing their operation; a source of fluid pressure; and means selectively operative for connecting the corresponding portions of all of the cylinders, on one side of their respective pistons or the other, with said pressure source.

2. In combination with a plurality of hydraulically operated actuators each comprising a cylinder having a piston movable in either direction by the introduction of fluid pressure into said cylinder; rotatable means supported within the cylinder so as to be immovable longitudinally therein, said means being connected to the piston so as to be rotated thereby in response to piston reciprocation; rigid torque transmitting means connecting the rotatable means of adjacent actuators for synchronizing them; and power transmitting means attached to the piston and extending to the outside of the cylinder.

3. In combination with a plurality of hydraulically operated actuators, each comprising a cylinder having end closure members and a piston therein forming two work chambers, said piston being reciprocative in response to fluid pressure in one or the other chamber; a shaft rotatably supported within the cylinder and immovable longitudinally thereof, said shaft being mechanically connected to the piston so as to rotate in response to reciprocation of the piston; a conduit connecting adjacent actuators and providing communication between corresponding work chambers thereof; a power transmitting element within said conduit, said element operatively connecting the shafts of adjacent actuators for synchronizing their operation; a source of fluid pressure; and controlled means connecting said source of fluid pressure to the conduit and to the respective work chambers of the actuators not connected with the conduit, said controlled means directing fluid pressure to corresponding work chambers of all actuators while the other corresponding work chambers are connected to drain.

4. A device in accordance with claim 3 in which the closure member at one end of each actuator cylinder provides a housing rotatably supporting a gear operatively engaging the shaft in the cylinder; a pipe attached to and connecting the said closure housings of adjacent actuators and providing communication between corresponding work chambers of said actuator cylinders; a source of fluid and means for delivering said fluid under pressure; a control valve in communication with both the source of fluid and said pressure delivery means; and separate conduits respectively connecting the pipe and the cylinder work chambers of the actuators not in communication with said pipe with the control valve which is operative to connect either one of said conduits with the fluid source while the other conduit is connected to the fluid pressure delivery means.

5. In combination with a plurality of hydraulically operated actuators each having a member adapted to be reciprocated by the application of fluid pressure against one side or the other of said member for extending or retracting the actuator; a rotatable but longitudinally immovable element operatively connected to said member; a tubular sheath attached to adjacent actuators for tying them together; a power transmitting shaft in said sheath, the ends of the shaft being operatively connected to the rotatable elements of the actuators tied together by said sheath; a source of hydraulic pressure; and conduits connecting the pressure source with the actuators on both sides their respective reciprocative members, the sheath forming one part of the pressure conducting conduits leading to the corresponding sides of the reciprocative members of all actuators.

6. In combination with a plurality of actuators each comprising a cylinder and a lineally movable piston disposed in said cylinder capable of fluid pressure actuation in either direction, a member rotatably supported within the cylinder and operatively connected to the piston such that said member will rotate in response to linear movement of said piston, and means including a rotatable element interconnecting the rotatable members of adjacent actuators for effecting synchronous operation thereof.

7. In combination with a plurality of actuators each comprising a cylinder and a lineally movable piston disposed in said cylinder capable of fluid pressure actuation in either direction, a member rotatably supported within the cylinder and operatively connected to the piston, the operative connection between said piston and member including an element operatively connected with said piston so as to move lineally therewith, said element having operative engagement with said rotatable member such that relative rotation will occur between said element and member upon linear movement of said piston, and means including a rotatable shaft interconnecting the rotatable members of adjacent actuators for effecting synchronous operation thereof.

8. A multiple actuator system including in combination, a plurality of linear actuators each adapted for connection at one end to a relatively fixed support and at the other end to a relatively movable load device, each actuator including a cylinder having disposed therein a lineally movable piston capable of fluid pressure actuation in either direction, and driving mechanism interconnecting the actuator pistons constructed and arranged to effect synchronous operation of said actuators, said driving mechanism including a rotatable member in each cylinder and operatively connected to the piston in each cylinder such that said member will rotate in response to linear movement of said piston, and torque transmitting means operatively interconnecting the rotatable members of said actuators.

9. The combination set forth in claim 8 wherein the operative connection between said piston and said rotatable member includes an element secured to said piston so as to move lineally therewith, said element having threaded engagement with said member.

HOWARD M. GEYER.

References Cited in the file of this patent

UNITED STATES PATENTS

| Number | Name | Date |
|---|---|---|
| 1,469,689 | Prius | Oct. 2, 1923 |
| 2,487,402 | Watson | Nov. 8, 1949 |